2,783,404
STATOR LAMINATION WELDED ASSEMBLY

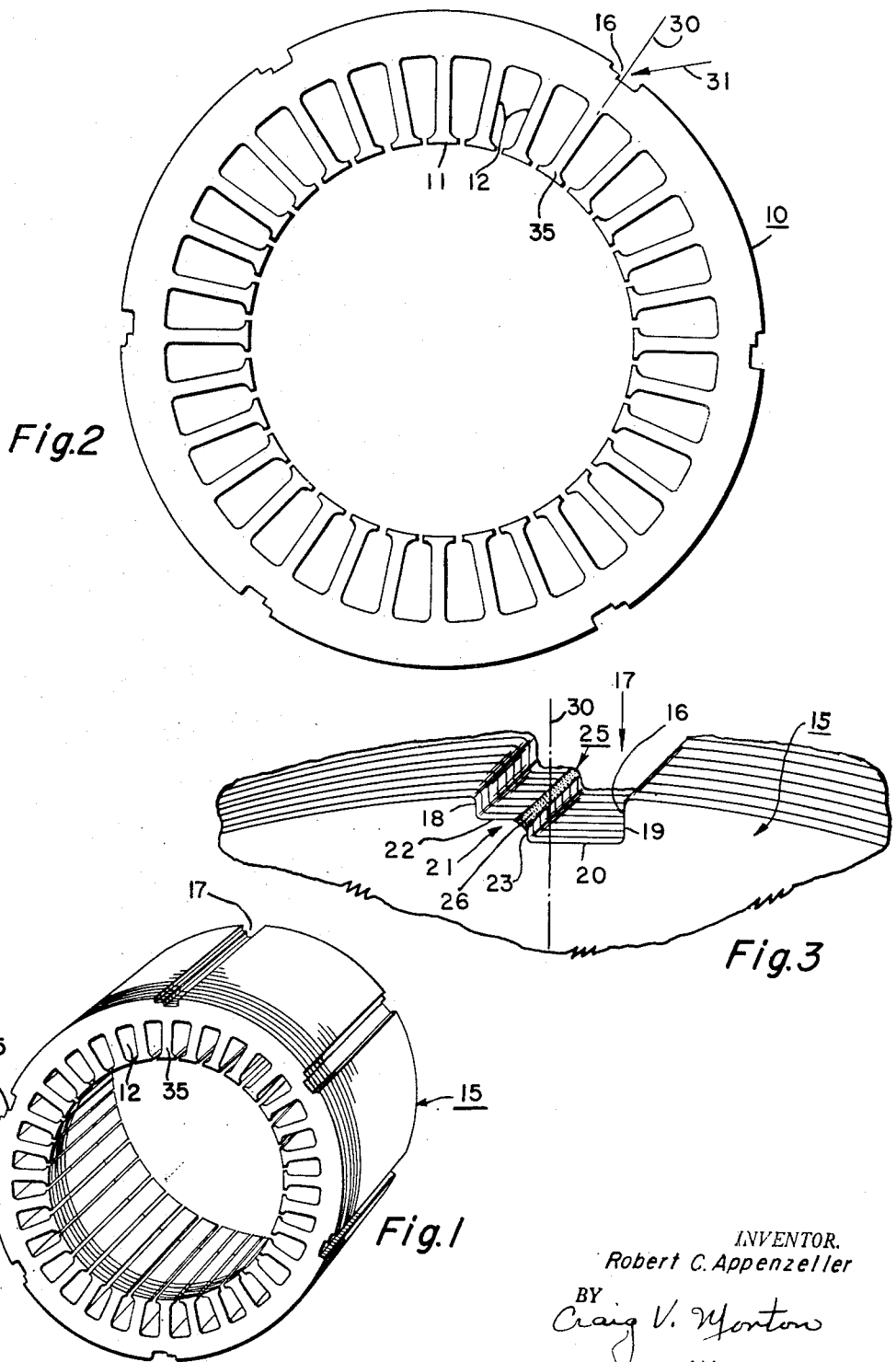

Robert C. Appenzeller, Dayton, Ohio, assignor to General Motors Corporation, Detroit, Mich., a corporation of Delaware Application March 2, 1954, Serial No. 413,532

1 Claim. (Cl. 310—217)

This invention relates to improvements in laminated core constructions for dynamo-electric machines, and relates particularly to an improved laminated core construction for the stator of a dynamo-electric machine by which the core laminations are welded into an integral unit.

It has been proposed to weld the laminations of a stator core together to provide a more permanent bonding of stator laminations than heretofore provided in conventional bolted or riveted constructions. However, the high heats required for the welding of the laminations have resulted in considerable warping of the welded stator assemblies because of the expansion and contraction of the material undergoing fusion and subsequent cooling.

One of the problems is therefore to provide a laminated core assembly with a welding edge arranged in a manner to reduce the amount of heat transmitted into the core assembly during welding, and to position the fused weld line in a portion of the laminated assembly that will be the least effective in causing warping of the assembly that results from the fusion of the material and subsequent cooling.

In the manufacture of welded core assemblies for dynamo-electric machines it is also desirable that the weld be arranged in a location in the assembly that subsequent machining of the assembly will not affect the weld lines, such as removing a part of it to reduce the adherence bond between the laminations.

It is therefore an object of this invention to provide an improved laminated core construction wherein the laminations of the core are welded together along a weld line placed substantially below the outer periphery of the core assembly.

It is another object of the invention to provide an improved laminated stator core construction wherein a corner ledge is provided within a groove extending longitudinally of the core assembly that is fused by welding heat to bond the laminations of the assembly.

Further objects and advantages of the present invention will be apparent from the following description, reference being had to the accompanying drawings wherein a preferred form of the invention is clearly shown.

In the drawings:

Figure 1 is a perspective elevational view of a laminated stator core for assembly incorporating features of this invention.

Figure 2 is an elevational view of a lamina of the assembly of Figure 1.

Figure 3 is an enlarged perspective view of a portion of a stator core assembly illustrating the position of the weld line for bonding the lamina into a unitary structure.

The features of this invention are illustrated as being applied to a laminated core for the stationary member of a dynamo-electric machine which includes an assembly of a plurality of laminations 10 formed of magnetic material. The laminations 10 are assembled in face to face relationship to form a stator core 15, as illustrated in Figure 1. Each of the laminations has a central opening 11 from which a plurality of winding slots 12 radiate. The winding slots 12 receive the stator windings in conventional manner.

On the outer peripheral surface of each of the laminations 10 there is provided an open top slot 16, these slots 16 being positioned equidistantly about the periphery of the lamination, as shown in Figure 2.

When the laminations 10 are assembled into a stator core, as illustrated in Figure 1, the slots 16 of the laminations form a longitudinally extending slot or groove 17 in the stator core.

The shape of the individual lamination slots 16, and thus the shape of the longitudinally extending groove 17 is more particularly illustrated in Figure 3. The slots 16 extend inwardly from the outer periphery of the core 15, each of the slots having the side walls 18 and 19 and a bottom wall 20.

The bottom wall has a step 21 therein that is formed with a top wall 22 and a side wall 23, these walls being parallel with the bottom wall 20 and the side wall 18 respectively. The step 21 is thus elevated above the bottom wall 20 and extends between the side wall 18 and the bottom wall 20 of the slot 16.

The step 21 formed by the walls 22 and 23 forms a corner 25 that is utilized to effect a welding of the adjacent laminae together. The corner 25 is fused longitudinally along the length thereof by suitable weld heat to produce a weld line 26 that extends longitudinally of the slot 17 substantially parallel with the axis of the core 15.

The step 21 in the slot 16, or the groove 17, is positioned on one side of the center line 30 of the groove 17 so that a welding fixture can be introduced into the slot or groove substantially normal to the corner 25, as illustrated by the arrow 31 to effect welding of the corner 25. With the step 21 being positioned on one side of the groove 17 formed by the slots 16, sufficient clearance is provided in the groove for entry of a conventional heating tool to effect the desired fusion of the corner 25.

The corner 25 is substantially isolated from the main body of the lamina 10 by means of the walls 22 and 23, the step 21 being a triangular protrusion between the walls 18 and 20 of the groove 17. Thus transmission of heat to the stator core assembly is held to a minimum and the fusion of the material in the corner 25 of the step 21 is relatively remote from the body of the stator lamination 10.

Also, since the welding corner 25 in the groove 17 is confined within the groove, and is substantially below the surface of the outer periphery of the core 15, the weld along the corner 25 is not in any way disturbed by any finishing operation desired on the periphery of the stator core 15.

The welding corner 25 is placed substantially in alignment with the leg 35 provided between adjacent winding slots 12. This positioning of the welding corner 25 places it relative to the mass of the lamination assembly that the greatest mass is in alignment with the welding tooth whereby to minimize distortion in the laminated assembly. Also, since the welding tooth is in alignment with the leg 35, the leg functions somewhat as a fan to radiate heat and thereby tend to lower the temperature rise of the mass of the assembly.

While the form of embodiment of the invention as herein disclosed constitutes a preferred form, it is to be understood that other forms might be adopted as may come within the scope of the claim which follows.

What is claimed is as follows:

A dynamo-electric machine core assembly composed of a plurality of sheet laminations each having a central opening from which winding slots radiate, a plurality of radially disposed legs formed with said core assembly separating the winding slots from each other and extending therebetween to provide equal radial depth for each of the winding slots about the inner periphery of said core assembly, a triangular protrusion formed with said core assembly radially aligned with one of said legs, said protrusion being formed as a raised step completely to one side of the radial centerline of a groove formed in the outer periphery of the assembly, the step joining a bottom and a side wall of the groove forming thereby a single angle corner within the confines of the groove raised above the level of the bottom of the groove and spaced from the side wall extending from the bottom wall of the groove, and a weld line formed along said corner bonding the laminations together properly aligned relatively to each other by stacking thereof to form the groove with the distortion-free step while said one leg radially aligned with said protrusion functions like a heat radiating fan tending to lower the temperature rise of the mass of the assembly from said weld line.

References Cited in the file of this patent

UNITED STATES PATENTS 2,448,785   Dolan ------------------ Sept. 7, 1948